Sept. 22, 1964　　　C. P. XENIS　　　3,149,646
APPARATUS FOR SEALING LEAKS IN PIPES
Filed April 3, 1961　　　　　　　　　　　　　4 Sheets-Sheet 2
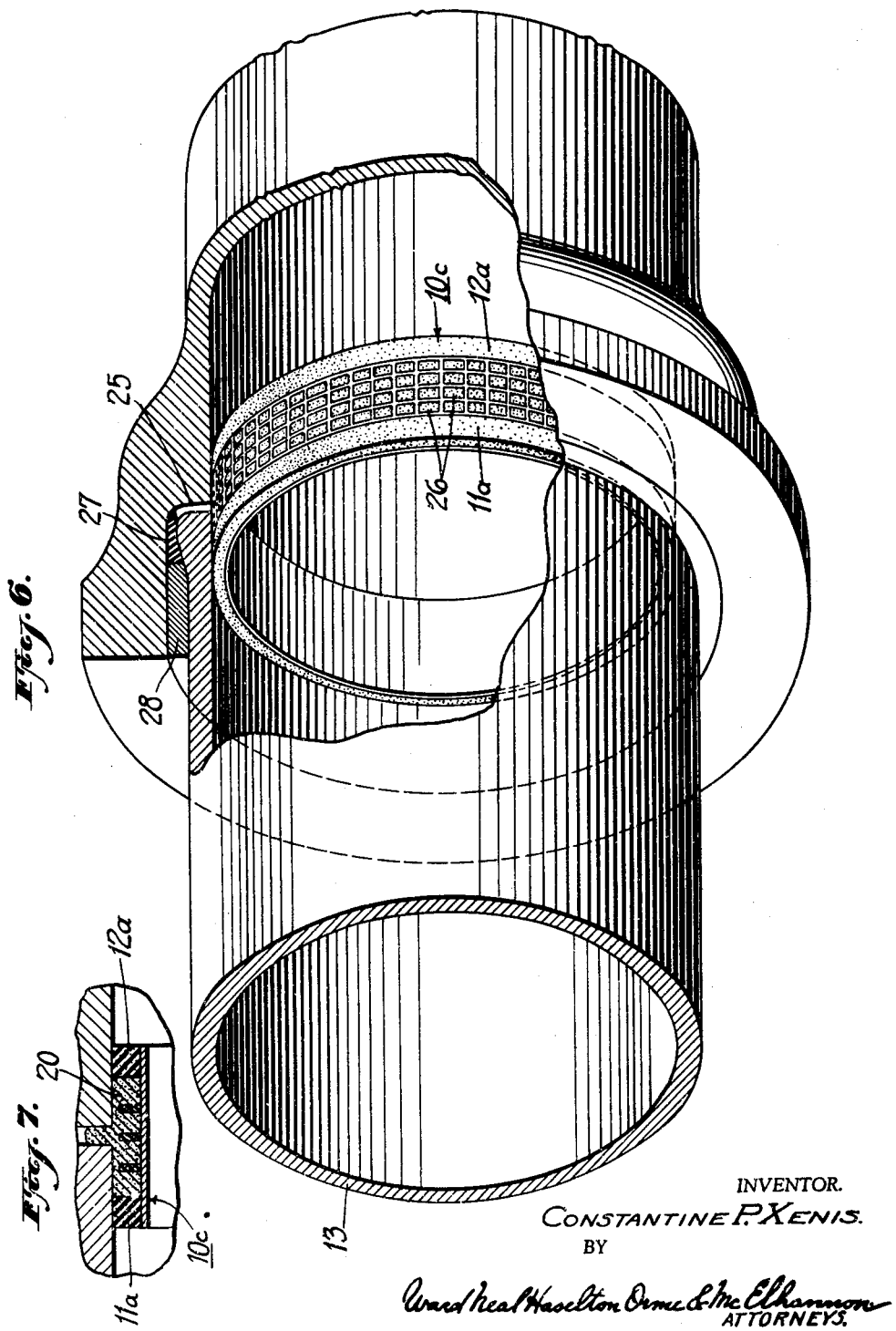
INVENTOR.
CONSTANTINE P. XENIS.
BY
*Ward Neal Haselton Orme & McElhannon*
ATTORNEYS.

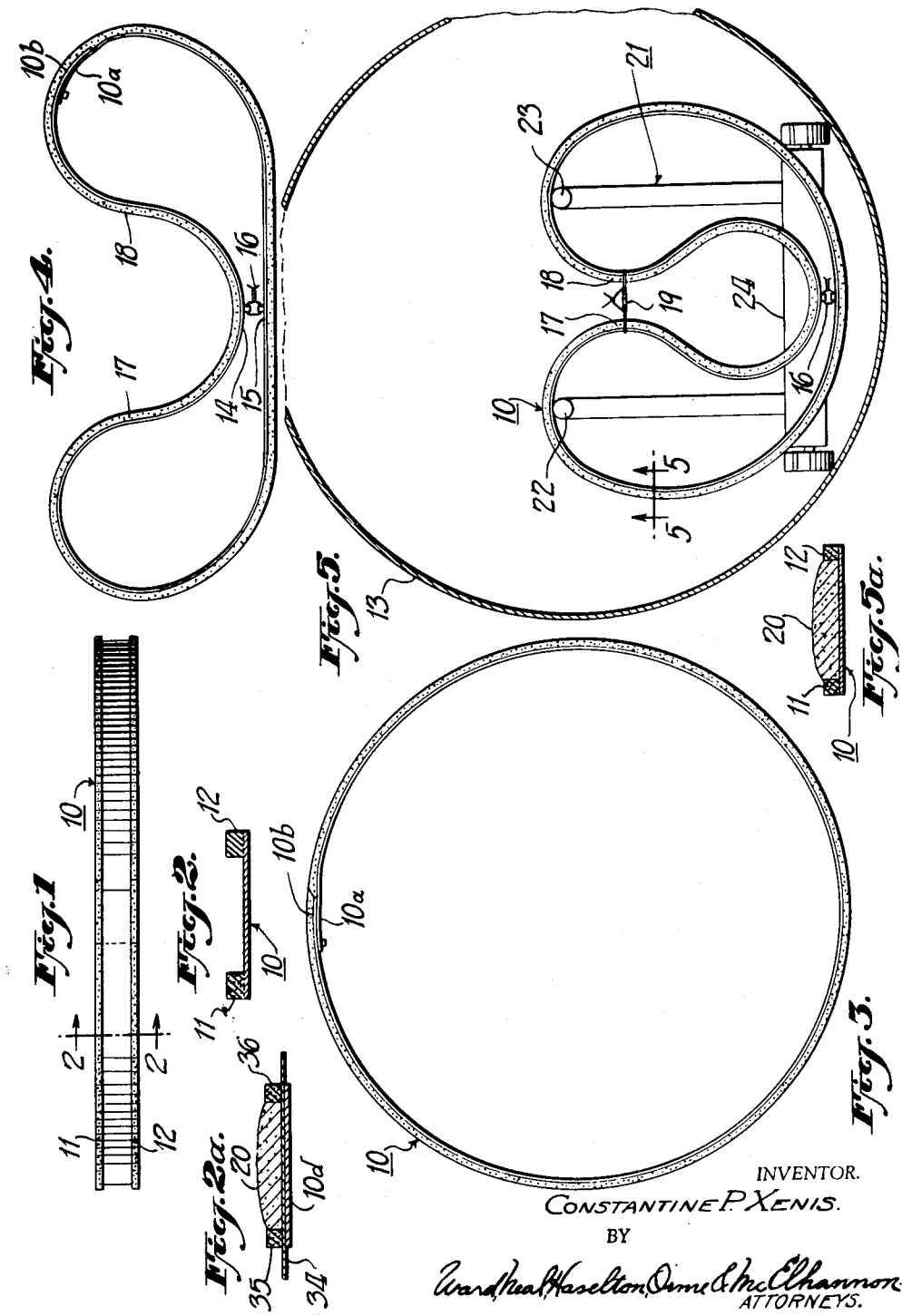

Sept. 22, 1964          C. P. XENIS          3,149,646
APPARATUS FOR SEALING LEAKS IN PIPES
Filed April 3, 1961          4 Sheets-Sheet 3
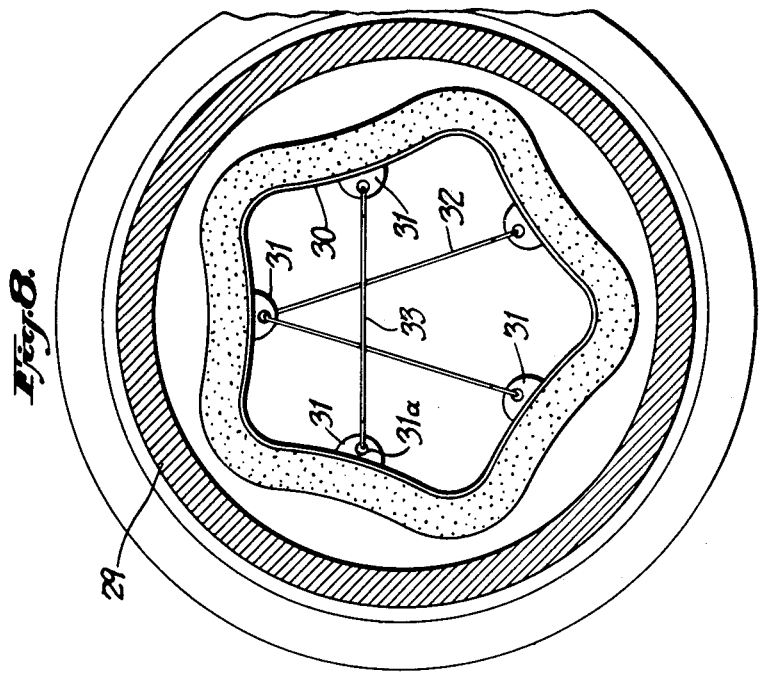
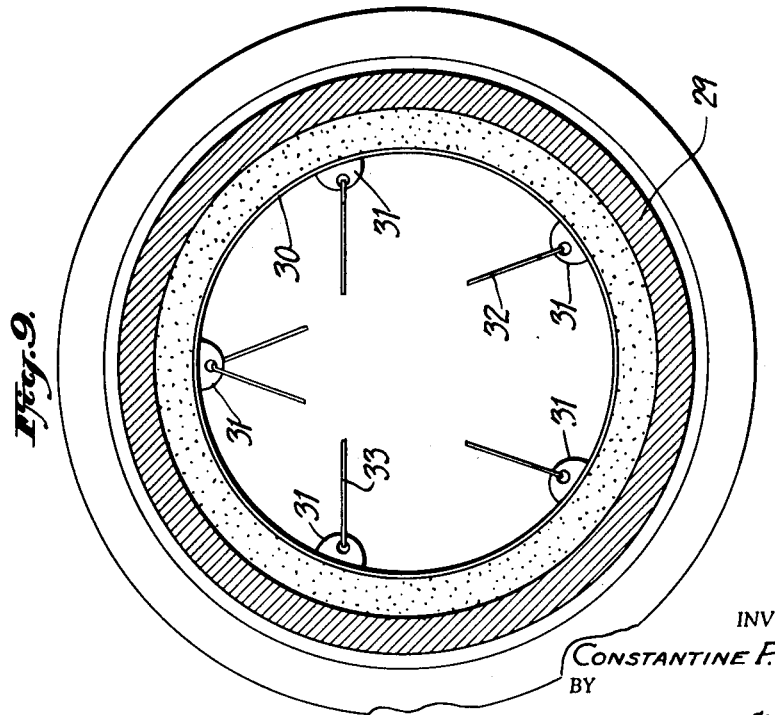
INVENTOR.
CONSTANTINE P. XENIS.
BY
*Ward Neal Haselton Orme & McClennen*
ATTORNEYS.

Sept. 22, 1964     C. P. XENIS     3,149,646
APPARATUS FOR SEALING LEAKS IN PIPES
Filed April 3, 1961     4 Sheets-Sheet 4
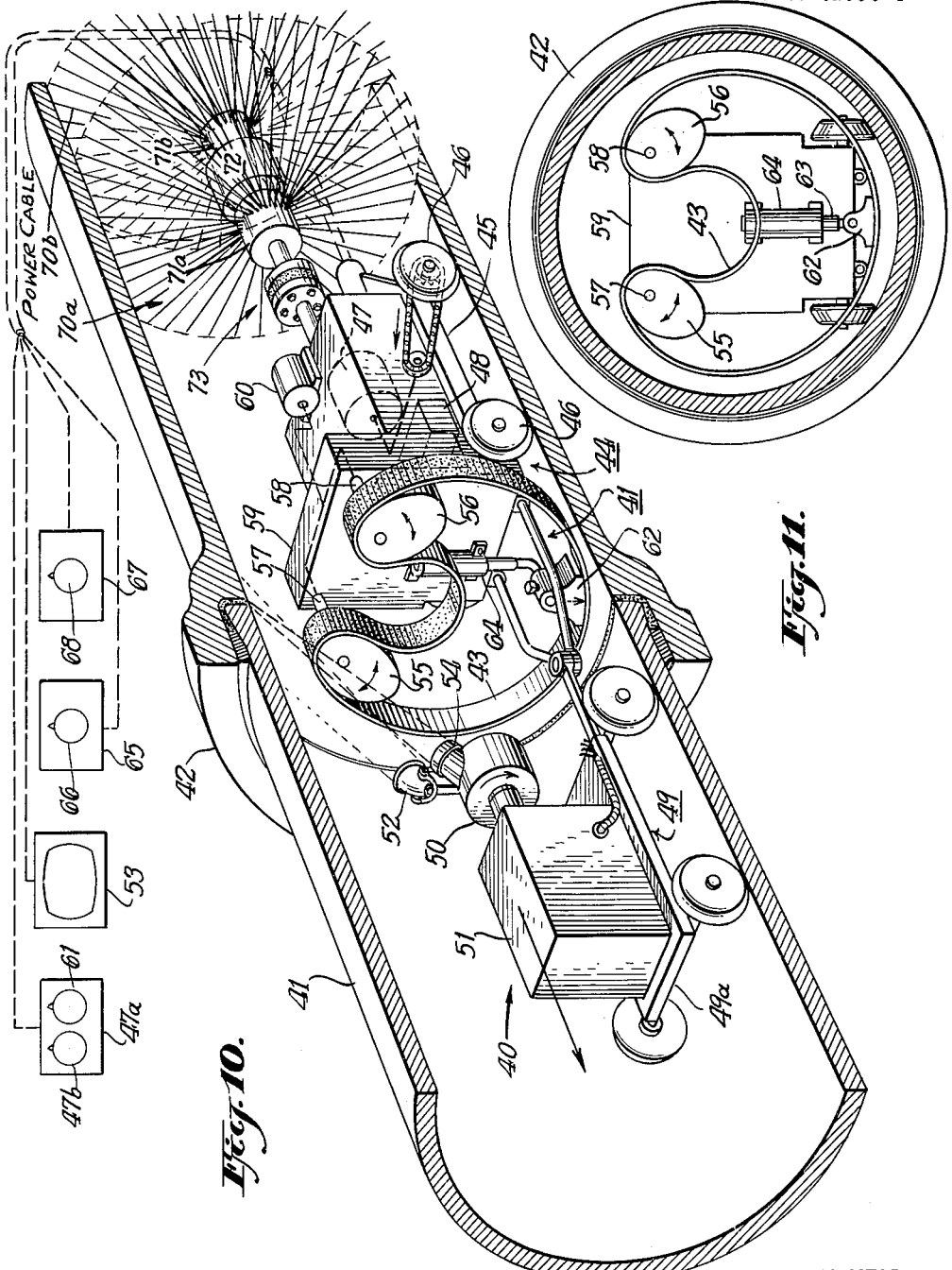
INVENTOR.
CONSTANTINE P. XENIS.
BY
*Ward, Neal, Haselton, Orme & McChannon*
ATTORNEYS.

United States Patent Office 3,149,646
Patented Sept. 22, 1964

3,149,646
APPARATUS FOR SEALING LEAKS IN PIPES
Constantine P. Xenis, Douglaston, N.Y., assignor to Consolidated Edison Company of New York, Inc., New York, N.Y., a corporation of New York
Filed Apr. 3, 1961, Ser. No. 100,283
4 Claims. (Cl. 138—97)

This invention relates to the sealing of pipes, and more particularly to the sealing of pipe joints, the invention being especially useful in the sealing of leaks in gas main systems.

Most of the joints in existing gas main systems are of the bell and spigot variety in which jute inner packing is used, the jute being usually secured in place by a lead outer packing.

In the past deterioration of such jute packing has been minimized because of the moisture contained in the type of gas transported by the mains, namely, "manufactured gas," which moisture has prevented the drying out of the jute. So long as such jute receives adequate moisture from such source, the packing of the joints enjoys a normal life of many years. In recent years, however, natural gas has come into wide use and, due to improvements in pipe-line transportation, is now used in many parts of the country where manufactured gas was previously used. Since natural gas is extremely dry, its use tends to dry out the packing of the pipe joints in the gas mains. In particular, it drys out the jute packing and causes it to become powdery. The drying of the jute packing produces substantial leaks in the pipe joints in a relatively short time. Also, minute shifting or heaving of the earth and vibrations caused by traffic or other causes contribute to the deterioration of the packing of the joints. It is also believed that the motion of gas through the pipe may cause continuous but small vibrations in the pipe which may accelerate deterioration of the jute. It has thus become necessary in areas where natural gas is transported through previously established gas main systems designed for manufactured gas, to take action to prevent the rapid deterioration of the jute packing.

Previous methods of repairing leaks in gas mains, or in treating joints in such pipes to prevent the development of leaks, has involved the expensive operation of excavating around each joint or leak in order to expose the pipe so that suitable sealing operations may be performed on the outside of the pipe. A typical procedure for sealing pipe joints in the past has involved digging an excavation, which may frequently measure as much as five feet by four feet in horizontal area and five or more feet in depth, in order to expose the pipe joint. A pipe joint clamp is applied having well known mechanical means for sealing the mouth of the joint between the outer lip of the bell and the adjacent spigot part of the joint. In some instances the pipe joint may be completely recaulked. Such procedures are extremely expensive in that the entire operation must be repeated at every joint.

One of the objects of the present invention is to provide novel means for sealing pipe joints or leaks in pipes and which overcomes the aforementioned disadvantages.

The invention in one aspect thereof comprises novel apparatus for effecting the method of releasably holding in a non-annular condition a normally annular sealing ring of resilient, flexible, collapsible material, such as sheet steel, there being sealing material applied to the periphery of such ring, positioning the ring, while held in such non-annular condition, within a pipe joint to be sealed, releasing the ring, and causing same to move into annular shape to press the sealing material against the inner surface of such pipe joint.

Thus according to one embodiment of the present invention a leak or joint in a pipe may be sealed by the use of a resilient, deformable sealing ring. Because of its resilient and deformable nature the sealing ring can be deformed into a non-annular shape. The periphery of the ring is coated with suitable sealing material and the ring in a deformed, non-annular condition is positioned within the pipe at the point at which the pipe is to be sealed. The sealing ring is then caused to return to its undeformed condition whereby the ring presses the sealing material tightly between the ring and the inside of the pipe. The sealing material thus cooperates with the ring in providing an effective seal.

The deformable, resilient sealing ring used in practicing this invention preferably comprises a ring or band of relatively thin, flexible, resilient metal capable of being deformed sufficiently to fit into the pipe easily, such resiliency aiding same to spring back to its original shape in order to press tightly against the inside circumference of the pipe. A circular band of thin spring steel is for instance suitable for this purpose.

A sealing ring of the above type is preferably provided on its outer surface with means for assisting in retaining a desired thickness of sealing material on the outer surface of the sealing ring. A sealing material which can be successfully used is described in greater detail below. It is generally a plastic material which is initially sufficiently soft to be applied easily to the sealing ring and then cures or sets into a more hardened condition after the sealing of the joint is completed. The desired properties of the sealing material are: that it be a highly viscous liquid or plastic (which will not flow off the sealing ring after it has been applied thereto) at the time of application, that it be able to set to a firm state without shrinkage, that it have adhesion to steel or iron, and that it be impervious to natural gas or related petroleum products. Suitable means may be used as an aid in retaining such sealing material on the outer surface of the sealing ring. Peripheral beads or ridges, as of sponge rubber, on the outer surface of the sealing ring are desirable for this purpose. Such ridges or beads preferably are located along the opposite peripheral edges of the sealing ring.

The sealing ring in its annular undeformed condition should have a circumference only slightly smaller than the internal circumference of the pipe at the place to be sealed. The external circumference of the sealing ring should be less than the internal circumference of the pipe in order to allow the sealing ring to return completely to its undeformed condition. The external circumference of the sealing ring after it has been coated with the sealing material and has been allowed to return to its undeformed condition should be greater than the internal circumference of the pipe in order to insure that an adequate seal is effected. Since the sealing ring is placed in position and allowed or caused to return to its undeformed condition while the sealing material is still relatively soft and uncured, the excess sealing material is readily displaced and is squeezed out between the sealing ring and the inside of the pipe. The sealing material remaining between the sealing ring and the inside of the pipe is thus forced against the pipe under pressure and tends effectively to seal any leaks. The sealing material then cures or sets to produce a permanent seal. The sealing ring in its undeformed condition prior to the addition of the sealing material may have an external diameter, for example, between about 0.25 to about 1 inch less than the internal diameter of the pipe. The sealing material is preferably placed on the outside of the sealing ring in a layer of suitable thickness. The use of soft edge beads or ridges, as described above, facilitates the positioning of the desired amount of sealing material on the sealing ring.

The expansion of the sealing ring to its undeformed condition within the pipe applies the sealing material to the internal surface of the pipe conforming to all the irregularities of such surface. In addition to the plasticity necessary to accomplish this result the sealing material should become firm but resilient thereby to withstand the internal gas pressures at all times, and also to form a seal which will withstand the effect of vibration or slight movement of the pipe. The sealing material is preferably thixotropic. Adhesion to the metal surface of the pipe, while not essential to the formation of a good seal since the internal pressure of the gas maintains a seal, is highly desirable in obtaining an effective seal.

The preferred sealing material for use with this invention comprises a polysulfide rubber formed by mixing liquid mercaptan terminated polysulfide polymer with a catalyst such as lead peroxide to form an adhesive plastic which cures in a relatively short time after mixing. Such materials are generally known as thiokols and are relatively thixotropic. The viscosity of mercaptan terminated polysulfide polymers may be lowered considerably by agitation in order to increase the ease of applying the sealing material to the sealing ring. Due to the thixotropic nature of such material, agitation does not affect to an undesired degree the ability of the material to hold its shape once it is applied to the sealing ring. Such a sealing material cures within a day or two (e.g. 48 hours at 70° to 80° F.) to form a resilient rubber-like material having ample mechanical strength to withstand the internal gas pressures to which it is subjected.

The sealing ring, such as that described above, may be deformed in any manner which reduces the effective circumference thereof and the applied sealing material to less than the internal circumference of the pipe. By effective circumference is meant the circumference of the circle which would be required to contain the periphery of the sealing ring in its deformed condition after it has been coated with sealing material. The sealing ring can, for instance, be deformed by deforming the periphery of the ring inwardly at one or more points and securing the ring in such deformed position by the use of wires or tie rods. Such wires or tie rods can then be released when the ring is in place to allow the ring to return to its normal, undeformed condition.

A preferred sealing ring comprises a thin band of spring steel equipped on its outer surface with sponge rubber edge beads to aid in positioning the sealing material. A preferred method of deforming such a sealing ring comprises bringing two opposite points of the ring together or nearly together and securing them with wire. The ends of the cross-section thus formed are then brought together as nearly as possible and secured with wire. In this configuration the sealing ring has an effective circumference much less than its original circumference and can easily be inserted into the pipe. Once in position the wires can be released to allow the sealing ring to return to its original shape and press against the inside of the pipe along its entire circumference. The releasing of the wires is preferably controlled so that the return of the sealing ring to its undeformed condition is gradual. The sealing ring is, of course, coated with sealing material prior to being released to its original shape so that an effective seal is formed.

The deformed sealing mean may be inserted into the pipe by any suitable means. The means to be employed will usually depend on factors such as: the size of the pipe, the distance to the point of use of the ring, and the presence or absence of corrosive or harmful substances in the pipe. If, for instance, the pipe is a large one of 48 inch inner diameter, it may be desirable to place the sealing ring by mounting same on a dolly which is moved into the desired position. If the pipe is too small to allow a workman to enter it, the sealing ring may be pushed into the pipe with push rods and may be mounted on any suitable transporting and releasing mechanism, and where required means may be provided for urging the ring against the inner surface of the joint.

When the sealing ring is being positioned by the use of remotely controlled devices and without the aid of a human inside the pipe, any suitable means may be used for locating the joint at which it is desired to utilize the sealing means. Such means may include a small television camera inserted in the pipe for the purpose of observing the location of the joint. Such means may also include electrical sensing means for sensing the location of the pipe joint by sensing a change in the electromagnetic characteristics of the pipe at the joint, e.g. due to increased mass.

In some instances the interior surface of the pipe at the point to be sealed may be contaminated with dirt, gum, or other substances which might interfere with obtaining a proper seal. In such cases it is within the scope of this invention to remove any such contaminating substances by any suitable means prior to applying the seal. Such deposits might, for instance, be removed by mechanical devices such as revolving wire brushes or might be removed by suitable chemical solvents, etc.

Although the present invention finds its most frequent application in the sealing of pipe joints, it is within the scope of the invention to use the method and apparatus disclosed herein for sealing fissures or cracks occurring in the pipe between the joints.

Various, further and more specific objects, features and advantages of the invention will appear from the description taken in connection with the accompanying drawings which form a part of this specification and illustrate, by way of example, embodiments of such invention. The invention consists in such novel features and combinations of parts as may be shown and described in connection with the method and apparatus herein disclosed.

In the drawings:

FIG. 1 is a side view of a band suitable for use as a sealing ring in accordance with the invention;

FIG. 2 is a sectional view of the band shown in FIG. 1 taken substantially along the line 2—2 of FIG. 1;

FIG. 2a is a sectional view of a modification of the construction shown in FIG. 2;

FIG. 3 is a plan view of the ring of FIG. 1;

FIG. 4 is a view showing the first step in deforming the sealing ring shown in FIG. 3;

FIG. 5 shows the sealing ring of FIG. 4 further deformed and positioned in a pipe;

FIG. 5a is a sectional view taken on line 5—5 of FIG. 5;

FIG. 6 is a perspective view of the sealing ring shown in FIG. 5 following its release from the deformed condition and in position to seal a joint of a pipe;

FIG. 7 is a sectional view showing in greater detail the sealing of a pipe joint as shown in FIG. 6;

FIG. 8 is a vertical sectional view showing another method of deforming the sealing ring of FIG. 3;

FIG. 9 is a vertical sectional view showing the sealing ring illustrated in FIG. 8 following its release from the deformed condition;

FIG. 10 is a perspective view of a pipe having therein apparatus embodying one form of the present invention and also disclosing certain remote control devices therefor; and FIG. 11 is an end view of means employed in FIG. 10 for supporting a sealing ring in a deformed condition.

Referring to FIGS. 1, 2 and 3, a sealing ring 10 suitable for sealing a pipe joint in accordance with this invention, comprises a band of sheet spring steel having soft sponge rubber edge beads 11 and 12 secured along the opposite margins of the periphery thereof. As shown in FIG. 3, the sealing ring 10 is held in ring form by securing together overlapping extremities 10a, 10b.

The first step in deforming the sealing ring 10 for insertion into a pipe, such as 13 (FIG. 5), a joint of which is to be sealed, is to bring close to one another opposite facing inner areas 14, 15 (FIG. 4) of the sealing ring and to hold same as in FIG. 4 by means of a wire loop 16. The ring 10 is then further deformed by bringing towards one another into close but spaced relation the opposite areas 17, 18 (FIGS. 4 and 5), and holding such areas in this relation as by a wire loop 19. When the sealing ring has been deformed into the shape shown in FIG. 5, it is coated on its outer surface with a layer 20 of sealing material (FIG. 5a) which is in a plastic condition. The sealing material is smeared over the entire outer surface of the sealing ring 10. The soft rubber edge beads 11 and 12 aid in obtaining the desired thickness of sealing material on the outer surface of such sealing ring 10.

After the sealing ring 10 has been deformed into the shape shown in FIG. 5 and coated with the layer 20 of sealing material, it is placed in position in the interior of the pipe 13 as shown in FIG. 5, for example, with the aid of a supporting structure 21 having arms 22 and 23 which are mounted upon a dolly 24.

When the sealing ring 10 has been properly positioned in pipe 13 in the region of a joint 25 (FIG. 6), where it is desired to effect a seal, the wires 16 and 19 are released or cut and the ring 10 is caused to resume its normal shape, the normal shape, of course, being a circle (FIG. 3). The sealing ring has a circumference in its undeformed condition only slightly less than the internal circumference of the pipe 13. With the addition of the layer of sealing material, the outer circumference of the sealing ring 10 becomes greater than the internal circumference of the pipe 13. When the wires 16 and 19 are released or cut, the sealing ring 10, due to its resilient and flexible material tends to resume such normal shape. When the ring 10 reaches its undeformed condition, it presses the sealing material forcefully against the interior of pipe 13. The edge beads 11 and 12 of sponge rubber or the like being soft and yieldable, do not interfere with the formation of a tight seal by the sealing material. Excess sealing material is squeezed out. As the sealing material cures or hardens it becomes less soft and plastic and preferably becomes a resilient rubber-like solid. In this way a seal is obtained which can successfully accommodate earth vibrations.

In FIGS. 6 and 7 a modified sealing ring 10c is employed which is similar to ring 10 except that there is located between edge beads 11a and 12a thereof a waffle-like pattern of sponge rubber-like partitions 26. The latter aid in holding the sealing material 20 to the ring 10c. The sealing rings 10 and 10c force the sealing material against the inside of the joint 25 throughout the entire circumference of the pipe. FIG. 6 also shows the conventional joint packing including jute 27 and lead 28, neither of which is disturbed by the use of the sealing ring 10 as described above.

FIGS. 8 and 9 illustrate another method of deforming a sealing ring for insertion into a pipe 29 in accordance with the invention. A sealing ring 30 is employed which is similar to sealing ring 10 described above. As shown in FIG. 8, lugs such as 31 are secured to the inner surface of sealing ring 30. Such lugs are provided with holes 31a through which wires, such as 32 and 33, are passed in order to hold the sealing ring 30 in the deformed state shown (FIG. 8). In the latter deformed condition the ring 30 is easily inserted in the pipe 29. When the ring 30, coated with said sealing material 20, is positioned within the pipe 29 (as by a dolly not shown), and in position to spring out to cover the inside of a pipe joint, the wires 32 and 33 are cut and the ring caused to return to its undeformed circular shape thereby pressing the sealing material against the interior of the pipe (FIG. 9) and establishing an effective seal.

Referring now to FIG. 2a, a modification of the construction shown in FIG. 2 is shown which permits reuse of the steel band per se, such as band 10d, alone and separated from its soft edge beads, this being accomplished by virtue of the interposition of a shield layer of flexible sheet material 34 between such band 10d and the remainder of the construction, namely, the edge beads 35 and 36 which are respectively analogous to the edge beads 11 and 12 of FIG. 2.

Such shield layer 34 preferably is of paper impregnated with a suitable resin or plastic, for example, an epoxy plastic. Alternatively, the layer 34 may consist of a cloth of glass fibers. Any suitable sheet material can be employed providing it can suitably separate the metal band 10d from the remainder of the structure thereby to permit the detachment of the band 10d from the seal after the latter has been made in accordance with the present invention, thus to permit reuse of such band. The layer 34 preferably extends beyond the edges of the band 10d (as viewed in FIG. 2a) by a suitable distance to aid in keeping the band clean, that is, preventing the fouling of such band by the sealing material 20.

The invention embodying FIG. 2a is desirable because of the substantial expense of each of the bands 10d which are not absolutely necessary to the maintenance of a seal once the sealing material has been suitably urged against the inside of a pipe joint in the manner above described.

One example of the sealing material which has been found suitable for use in the present invention is that manufactured by the Minnesota Mining and Manufacturing Company comprising a member of the Thiokol family of sealants sold under the designation "EC–801." Also there can be employed a Thiokol modified epoxy resin compound manufactured and sold by said company under the designation "EC–1472" employing a catalyst designated "EC–1473." The latter two substances are two basic types of compounds which afford the desired properties of being highly viscous liquid or plastic at the time of application, of later setting to a firm state without shrinkage, of providing an aggressive adhesion to steel or cast iron, and of resisting any deleterious effects of the ingredients of natural gas or related petroleum products. The above enumerated compounds EC–801, EC–1472 and EC–1473 are based primarily upon Thiokol polysulfide liquid polymers with suitable reinforcing and viscosity controlling pigments. They employ lead peroxide type catalyst to effect their cure.

Other compounds which may be employed in the present invention and which also are manufactured by the aforementioned Minnesota Mining and Manufacturing Company are designated by the latter as follows:

EC–766 which is an adhesive or coating material based primarily upon nitrile rubber modified with thermosetting resins;

EC–776R which is a variation of the latter and which contains a selected amount of pigment.

A further sealant manufactured by the above-designated company which may be employed also is designated EC–1477 which is polymerized by a catalyst EC–1478. Thus the sealant comprises a two-part compound or composition, the parts being designated by the two numbers last mentioned. The compound or composition is polymerized without any external heat applied thereto.

The aforementioned polysulfide rubber has characteristics which typify a desirable sealing substance. For example, the following characteristics thereof are:

Zero inches of flow as measured on a Boeing flow test jig meeting U. S. Air Force specification 7502A; and viscosity: a range of 40°–60° as measured on a viscosimeter of the McMichael type employing a No. 18 wire. Also, the sealant should be non-sag and flexible.

In one form of the invention the elements thereof comprise:

(1) The sealing ring above described to which is applied the sealant;

(2) Transporting means for the sealing ring which can include the aforementioned dolly or cart 24 which is pushed in a large pipe by hand to the location of the joint, or the dolly may be pushed by a succession of rods if the pipe is too small to admit a human. Alternatively, the transporting means can comprise a duct crawler apparatus as disclosed in my co-pending U. S. application Serial No. 581,630, now Patent No. 2,917,762, entitled "Apparatus for Travelling Through Pipes";

(3) A pipe joint locater which includes means for sensing changes in electromagnetic characteristics of the pipe caused by a change of pipe mass at the pipe joint; or alternatively the pipe joint locater may comprise a TV camera system including a small TV camera having a lens tilted axially relative to the longitudinal axis of the pipe in such a manner that it can detect the position of a joint when the distorted sealing ring is in proper position to be released inside the pipe for sealing such joint;

(4) Means for supporting the sealing ring in distorted condition, such supporting means being movable by the aforementioned transporting means;

(5) Means for releasing the sealing band from its collapsed or deformed condition, such means being remotely controllable.

FIG. 10 illustrates such form of the invention designated 40 and including the five elements set forth immediately herebefore. The apparatus 40 is shown within a pipe 41 having a bell portion 42 and embraces a sealing ring 43 which may, for example, be analogous to the sealing ring 10 of FIG. 5.

Transporting means 44 are employed which embraces a dolly or cart 45 which may be pushed in the pipe 42, for example, by the aforementioned succession of rods as when the pipe is too small to admit a human. Alternatively, the transporting means 44 includes power means for driving one or more of the wheels which support the dolly 45. Such wheels are shown at 46 and in the form shown are four in number. Such wheels may be driven by, for example, an electric motor 47 which is operatively connected thereto and which is controllable by remotely positioned device 47a including a manual control knob 47b outside the pipe.

The dolly or cart 45 can be pushed or pulled through the pipe 42 by a duct crawler apparatus as shown in said Patent No. 2,917,762, the disclosure of which is herein incorporated by reference.

The duct crawler apparatus as is more fully described in said Patent No. 2,917,762 is illustrated somewhat diagrammatically in FIGURE 10. However, it should be understood that where such duct crawler apparatus is used to move the transporting means 44 through the pipe, the electric motor 47 and its chain connection as shown in FIGURE 10 for driving the wheels 46 are omitted.

The duct crawler apparatus essentially comprises a pair of brushes 70a, 70b, having resilient and conically-fanned bristles which are attached to the respective brush cores 71a, 71b, and an electric motor 72 therebetween. The brush cores 71a and 71b are attached to, or are integral with the frame of motor 72, and the motor 72 contains an eccentric element so that, when the motor is running, a vibrationally imparted oscillating type of movement is imparted to the brushes which causes them to effectively "walk" through the pipe in the direction of the apex of their conically fanned shape. Thus, such duct crawler apparatus may be attached behind the dolly or cart 45, by a shaft and flexible type coupling such as is indicated by reference numeral 73, for the purpose of pushing the cart 45 through pipe 41.

Of course, where such duct crawler apparatus is used, the power cable shown in FIGURE 10 will not pass through the bristles of brushes 70a, 70b, and therefore, the location of the power cable in FIGURE 10 should be considered only as being diagrammatically illustrated. In such embodiment, the power cable could pass through the brush cores, motor, and shaft and flexible coupling.

A pipe joint locater 48 is employed and preferably is mounted upon the dolly 45. This element includes means for sensing the location of a pipe joint, for example, by sensing changes in electromagnetic characteristics of the pipe and indicating same outside the pipe, e.g., as in Patents 2,554,844; 2,602,833 or 2,894,539.

The pipe joint locater 48 of this character may be eliminated, if desired, and a pipe leak or fault locater 49 may be employed embracing an electric scanning and receiving means, for example, of the television type. Such means, in the form shown, includes a rotatable television camera 50 mounted upon a supporting means 51 embracing a device for rotating the camera about an axis preferably substantially in coincidence with the axis of the pipe. A suitable floodlight or lamp 52 is mounted upon the rotatable head of camera 50 to illuminate the interior of the pipe. A dolly 49a supports the fault locater 49 and is connected as shown to dolly 45, the connecting means passing through the loop of band 43. However, if desired, the dolly 49a can be connected to the opposite end of dolly 45, the apparatus moving to the right as viewed in FIG. 10. Thus there can be eliminated the rolling of the wheels over the released and expanded sealing band.

A receiver 53 is electrically coupled to the television camera and may, for example, be of the television type. The interconnection between the camera and receiver in the form shown is by an electrical cable.

The television camera 50 is provided with a lens 54 which, in the form shown, is directed angularly with respect to the axis of rotation in such a manner that the lens scans that area of the inside of the pipe which is positioned radially outwardly of the deformed sealing ring 43. Thus the scanning means facilitates the positioning of such ring and is capable of scanning the manner in which the ring is expanded, as will be set forth hereinafter, for the purpose of pressing same against the inside of the pipe.

Means for supporting the sealing ring 43 in a distorted condition (and also for releasing same) comprise, in the form shown, a pair of substantially oval-shaped rollers 55 and 56 which are mounted for rotation about axes substantially eccentric to the centers thereof respectively upon shafts 57 and 58. The two shafts 57 and 58 are rigidly secured at their lefthand extremities (FIG. 10) to such rollers 55 and 56 and their righthand extremities are supported in suitable bearings within a mounting 59 therefor.

The shafts 57 and 58 are concurrently rotatable in opposite directions by means of an electric motor 60 which is operatively connected thereto. The electric motor 60 is electrically coupled to a remotely positioned control knob 61 outside of the pipe which governs the speed and direction of rotation thereof.

The axes of rotation of the substantially oval-shaped rollers 55 and 56 are preferably situated in the same locations with respect to each roller and at a common degree of eccentricity.

The means for releasing the distorted or deformed sealing band 43 embraces the means for controlling the angular movement of the rollers 55 and 56. In this embodiment such releasing means includes the electric motor 60 and its manual control knob 61.

I have found it desirable to employ an additional element to aid in releasing the distorted sealing band comprising a shoe 62 which is situated at the lowermost portion of the sealing band, as shown in FIG. 10, and which presses downwardly upon the inside of such lowermost portion. The shoe 62 is mounted upon a vertical rod or shaft 63 which can be moved vertically, as viewed in FIGS. 10 and 11, under the influence of a solenoid 64. The shoe 62 is in a relatively raised position, as shown in FIG. 11, when the sealing band 43 is in a distorted condition. This permits the band to be easily transported through the pipe. However, when the band is to be released, the rollers 55 and 56 are rotated in opposite directions outwardly, as viewed in FIG. 11, and concurrently therewith or therebefore the shoe 62 is pressed downwardly by means of the solenoid 64.

The solenoid 64 is operatively connected to a control device 65 having a control knob or switch 66. When the solenoid 64 is deenergized, the shoe preferably is urged to an upper position against a suitable limit-stop, as viewed in FIG. 11, by any suitable means, for example, by means of a spring (not shown).

The rotatable movement of the television camera 50 may be remotely controlled by means of a device 67 having a control knob or switch 68, such device 67 being, for example, electrically connected to a motor which rotates the camera or scanning means 50.

The apparatus of FIGS. 10 and 11 is not limited to the placing of the sealing band on the inner pipe surfaces at a pipe joint but can be employed for placing it at any desired location and thus at any fault in the pipe.

One of the advantages of the present invention comprises the ability to apply the sealing substance to smooth out or fair pipe joints which have become misaligned.

Where the interior of the pipe is perfectly circular, I have found that the expanding sealing band with the plastic sealing substance thereon forms a liner of substantially uniform thickness throughout the 360° extent thereof. Thus the sealing band fills in the gaps with uniformity all around the band periphery and produces a cured strip of sealing substance which is of substantially common thickness throughout.

The band is expanded while the sealing material is still soft, the sealing material undergoing cure while the sealing band is centering itself and in effect floating to a central position within the pipe. There is a relationship between the strength of the sealing band as to its outward springing force and the viscosity of the plastic which allows the spring to assume the aforementioned central position. The sealing band, after it has expanded, performs the self-centering function because there are certain points of low resistance to the flow of the sealing substance at the periphery and also regions that offer relatively higher resistance. The band expands more easily in the direction where there is low resistance and less in the other region. The expanded spring in the process of taking its final centered position thus pushes sealing material away from those regions where there is an excess thereof but pushes none away where there is just enough and in effect physically floats and sets itself centrally. Thus the sealing band produces a flowing of the plastic sealing material while it is curing.

In a further form of the invention means are provided for rolling around the inside of the expanded sealing band or ring after its release and thus pressing same against the sealing material and the pipe. Such means may comprise, for example, a rotatable mounting for the shafts 57, 58 of the rollers 55, 56 whereby the peripheries of such rollers (when in suitable spread condition) act as the rolling and pressing means. If desired, the peripheries of such rollers 55, 56 in turn can be provided with a plurality of small rotatable cylindrical subrollers, the axes of which are parallel to that of their main rollers, thereby to facilitate the aforementioned rolling and pressing action.

This application is a continuation-in-part of my co-pending application Serial No. 705,204 now Patent No. 2,977,994.

What is claimed is:

1. Apparatus for sealing leaks in pipes comprising a resilient and flexible collapsible sealing ring normally of annular configuration which is adapted to be releasably held in a non-annular condition, sealing material being applied to the periphery of said sealing ring, means for transporting said sealing ring to a selected location within a pipe adjacent and in alignment with the region of a leak in said pipe which is to be sealed, said transporting means including means for supporting the sealing ring in the aforementioned non-annular condition, optical scanning means movable with and adjacent to said transporting means and directed angularly relative to the direction of movement of said transporting means for producing a continuous optical scan of the interior surface of the pipe at points corresponding to the position of said sealing ring, said optical scanning means including remote indicator means electrically coupled thereto, which remote indicator means can be positioned outside of the pipe at a substantial distance from the aforementioned apparatus and by which an operator can detect the presence and location of faults in the pipe, the operator being outside of the pipe and the apparatus being within the pipe, means for releasing the sealing ring from its non-annular configuration as supported by the aforementioned ring supporting means and including means for permitting the expansion of the non-annular sealing ring and allowing it to assume its normal annular shape, said releasing means also including control means positioned remotely from the apparatus and electrically coupled thereto for actuating said ring releasing means and thus releasing said ring.

2. The apparatus defined in claim 1 wherein said optical scanning means includes a light source and a television camera both directed at said points on the interior surface of such pipe.

3. The apparatus described in claim 1 wherein said means for supporting the sealing ring in non-annular configuration includes a pair of oval shaped rollers mounted for rotation about axes eccentric to their centers and parallel to the direction of movement of said transporting means, said sealing ring in its said non-annular configuration extending about and being depressed between said rollers, and wherein said releasing means includes motive drive means connected to rotate when actuated, said oval shaped rollers concurrently and in opposite directions about their respective axes.

4. Apparatus for supporting a resilient ring in non-annular configuration and for releasing same to expand to an annular configuration, said apparatus comprising a pair of oval shaped rollers, means mounting said rollers to rotate about axes eccentric to their centers and parallel to each other so as to permit depression of a section of a resilient ring therebetween while the remainder of such ring extends thereabout, and motive drive means connected to rotate, when actuated, said oval shaped rollers concurrently and in opposite directions about their respective axes so as to urge the depressed section of said ring out from between said rollers and into normal annular configuration.

References Cited in the file of this patent

UNITED STATES PATENTS

| | | |
|---|---|---|
| 2,877,368 | Sheldon | Mar. 10, 1959 |
| 2,894,539 | Cook et al. | July 14, 1959 |
| 2,908,248 | Brant | Oct. 13, 1959 |
| 2,971,259 | Hannau et al. | Feb. 14, 1961 |
| 2,977,994 | Xenis | Apr. 4, 1961 |

FOREIGN PATENTS

| | | |
|---|---|---|
| 614,592 | Great Britain | Dec. 17, 1948 |